United States Patent [19]

Kipp

[11] 4,435,709
[45] Mar. 6, 1984

[54] RADAR RANGING SYSTEM FOR USE WITH SLOPING TARGET

[75] Inventor: Ronald W. Kipp, Croydon, Pa.
[73] Assignee: RCA Corporation, New York, N.Y.
[21] Appl. No.: 266,983
[22] Filed: May 26, 1981
[51] Int. Cl.³ ............................................. G01S 13/32
[52] U.S. Cl. .................................. 343/14; 343/12 R; 266/99
[58] Field of Search ...................... 343/7 ED, 12 R, 14

[56] References Cited

U.S. PATENT DOCUMENTS

| | | | |
|---|---|---|---|
| 3,337,867 | 8/1967 | Badewitz | 343/7 ED |
| 3,362,024 | 1/1968 | Badewitz | 343/7 ED |
| 3,472,471 | 10/1969 | Badewitz | 343/7 ED X |
| 3,670,334 | 6/1972 | Gaheen, Jr. | 343/7 ED X |
| 4,219,814 | 8/1980 | Johnson | 343/12 R X |
| 4,290,067 | 9/1981 | Legille et al. | 343/12 R |
| 4,325,066 | 4/1982 | Grettenberg | 343/12 R X |
| 4,332,374 | 6/1982 | Kremer | 343/12 R X |

*Primary Examiner*—T. H. Tubbesing
*Attorney, Agent, or Firm*—J. S. Tripoli; R. L. Troike; R. E. Smiley

[57] ABSTRACT

A signal processing system for use with a radar ranging system which transmits a radio frequency beam of finite angle to a sloping target of not greater than some known slope and creates from the return signal a beat frequency signal comprising various frequencies corresponding to the various distances from the ranging system to the target. The processing system includes a first tracking bandpass filter which is caused to seek and lock onto the lowest frequency $F_L$ in the beat frequency signal. Given frequency $F_L$, the angle of the beam and the maximum slope of the target, a theoretical maximum frequency $F_X$ is computed. A second tracking bandpass filter tracks down from frequency $F_X$ to and locks onto frequency $F_H$, the frequency component in the beat frequency signal associated with the maximum range to the target. From frequencies $F_L$ and $F_H$ and the beam angle, the average range to and/or slope of the target can be computed.

14 Claims, 5 Drawing Figures

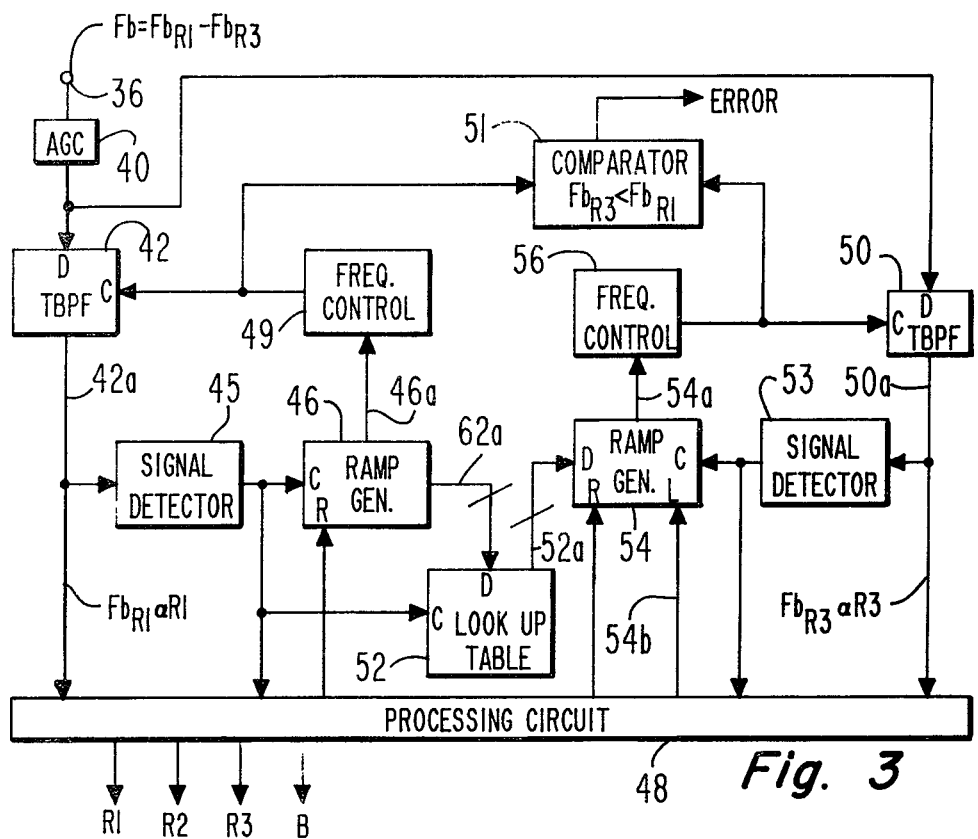
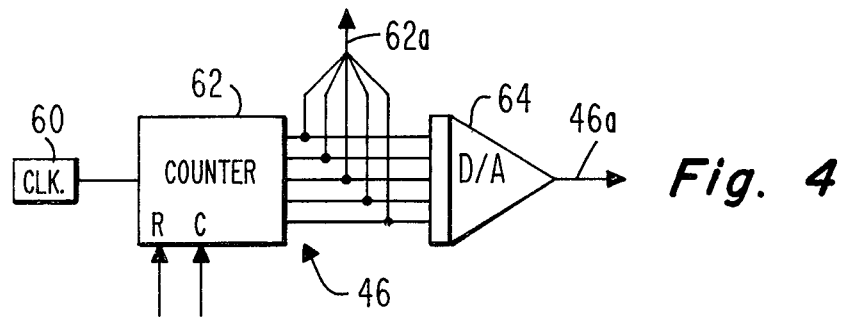
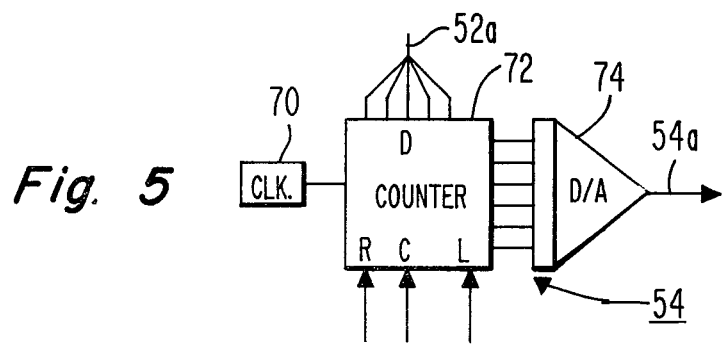

RADAR RANGING SYSTEM FOR USE WITH SLOPING TARGET

This invention relates to a signal processing system for use with a range determining system and more particularly, to such a system for determining the range to and slope of a sloping target.

FM frequency modulated/continuous wave (FM/CW) radar ranging systems are well known. U.S. Pat. No. 4,245,221 issued to the instant inventor and H. C. Johnson, and assigned to the assignee of the instant invention, is an example of such a radar system. Such systems employ a transmitting and receiving antenna which has a finite beam width. If the target, the range of which is to be measured, is not of uniform range from the antenna within the beam width, the FM/CW system produces a beat frequency signal which is comprised of multiple frequencies corresponding to multiple signal distances between the target and the antenna. Such multiple frequencies also can result from multipath signals and from electrical noise and generally cause the FM/CW system to give an incorrect range reading.

In some range measuring applications such as the measurement of burden in a blast furnace as described in more detail in the aforementioned U.S. patent, the surface to be measured is of unknown non-zero angle relative to the wavefront of the beam axis of the radar antenna. In the prior art, ranging apparatus is able to detect a substantially average range with some degree of accuracy, but it is not possible to determine the slope of a target.

In accordance with a preferred embodiment of the instant invention, a signal processing system, for use with an FM/CW radar range measuring system which transmits a radio frequency beam of finite angle toward a target which is at a non-normal angle to the transmitted beam and for receiving a reflected return signal to thereby generate a beat frequency signal having various frequency components corresponding to various ranges, comprises means for detecting the lowest frequency $F_L$ of the beat signal corresponding to the closest range to the ranging system. The system also includes means responsive to frequency $F_L$ and to the maximum angle a target can attain and to the beam width of the transmitted signal for determining the maximum range and therefore maximum possible frequency $F_X$ of the beat signal. Means are responsive to $F_X$ and to the beat signal for determining actual maximum beat frequency $F_H$ corresponding to the actual maximum range.

In the drawing:

FIG. 3 is a block schematic representation of a signal processing system for use with the radar system of FIG. 1 in accordance with a preferred embodiment of the invention; and FIGS. 4 and 5 are logic diagrams of ramp generators useful in the system of FIG. 3.

Figure 1:
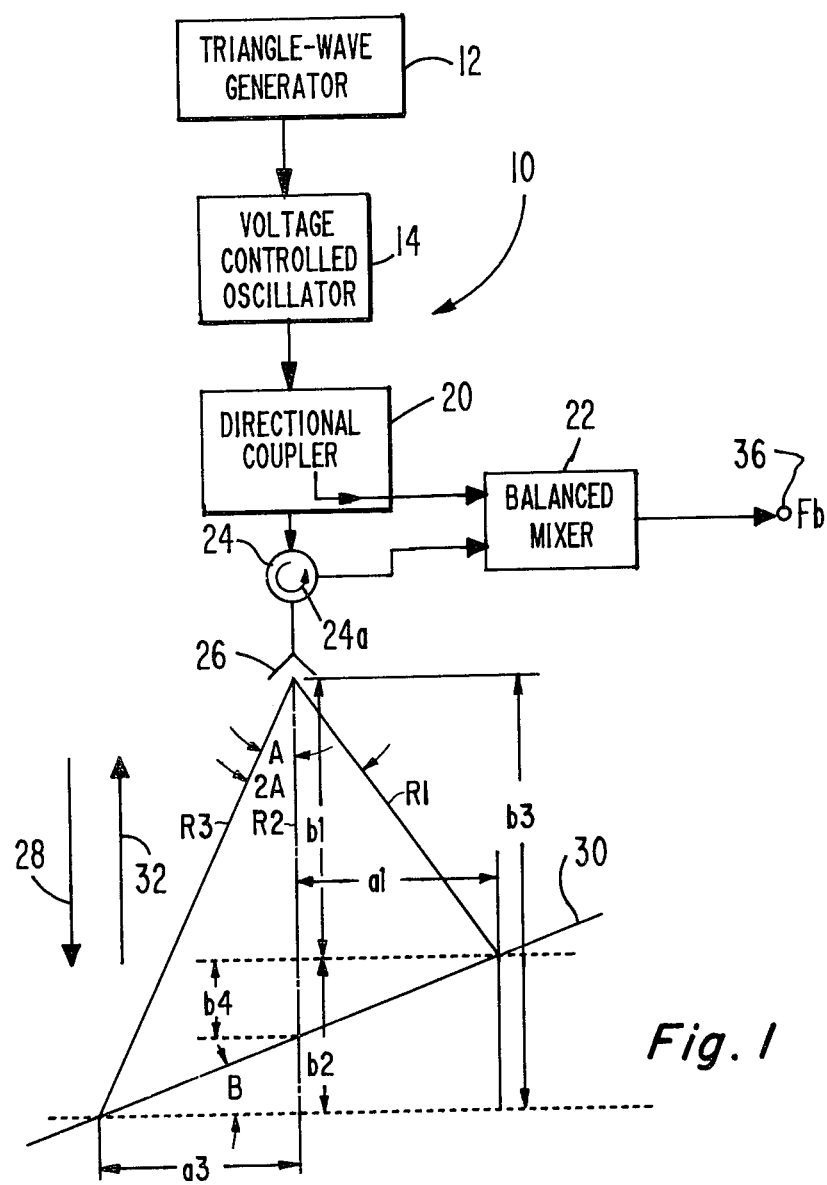
FIG. 1 is a block schematic representation of a basic FM/CW radar system.
Figure 2:
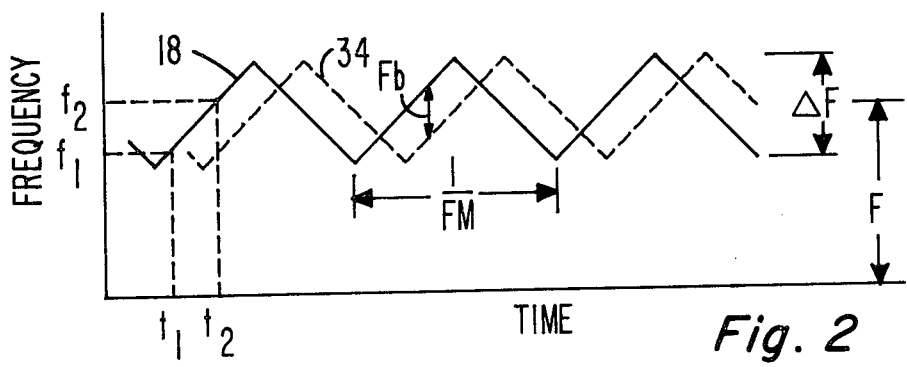
FIG. 2 is a set of waveforms useful in understanding the operation of the radar system of FIG. 1.

Referring now to FIG. 1, an FM/CW ranging radar system 10 of basic design comprises a triangle-wave generator 12 modulating a voltage controlled oscillator (VCO) 14 to produce the signal waveform indicated in the solid line 18 in FIG. 2, i.e. a signal centered at frequency F having a total frequency excursion of $\Delta F$ and modulated at a rate FM. The signal produced by VC0 14 is passed by a directional coupler 20 to one input of a balanced mixer 22 and to one port of a three port circulator 24.

A second port of circulator 24 is connected to an antenna 26, typically a transmitting and receiving antenna, for radiating the signal indicated at 18, FIG. 2, toward a suitable target 30, the beam centerline range R2 of which and/or slope B of which are to be determined. Arrow 28 indicates a signal being radiated to target 30 and arrow 32 indicates the return signal being reflected back from target 30 toward antenna 26. Target 30 may be, for example, the surface of burden material in a blast furnace (not shown). Angle B is the angle between the target 30 and a normal to the transmitted beam centerline designated by broken line R2. A typical antenna 26 does not radiate an infinitely thin beam of RF energy, but rather has a finite width of angle 2A as illustrated in FIG. 1. In FIG. 1 angle 2A is illustrated in an exaggerated fashion for purposes of description. In actuality, a typical angle 2A is on the order of 10°. The various dimensions in FIG. 1 as indicated by a and b followed by a number are for purposes of a mathematical description to be given hereinafter.

The reflected signal received at antenna 26, as illustrated in the dashed line 34, FIG. 2, is passed by circulator 24 in the direction of arrow 24a to a second input of balanced mixer 22. Balanced mixer 22 in response to input signals applied thereto produces a beat frequency signal Fb which is equal to the magnitude of the difference of the frequencies applied thereto. All components of FIG. 1 and their interconnection are of conventional design.

Referring to FIG. 2, if at a point in time $t_1$ a given frequency $f_1$ is transmitted by antenna 26 toward target 30 and if at a later time $t_2$ the signal at frequency $f_1$ is returned to antenna 26 to be thus applied to mixer 22 when frequency $f_2$ is also applied to mixer 22 via directional coupler 20, then $Fb = |f_2 - f_1|$ from which range R can be determined as follows:

$$Fb = \frac{4 \times R \times \Delta F \times FM}{C} \qquad (1)$$

where C is the speed of light and other terms are as illustrated in FIG. 2.

In a realistic situation in which the transmitted beam width from the antenna 26 is finite, as illustrated in FIG. 1, and where the range as illustrated in FIG. 1 is not a given distance but rather varies between a short range R1 and a long range R3 over that beam width, the beat frequency signal Fb is not of a given frequency but rather contains a mixture of frequencies.

The signal processing system of FIG. 3 to which attention is now directed is capable of determining slope angle B and average range R2 (FIG. 1). Terminal 36, which also appears in FIG. 1, is connected to the input of an automatic gain control (AGC) circuit 40 which amplitude levels the various frequencies $Fb_{R1}$ through $Fb_{R3}$ corresponding to ranges R1–R3. The output of AGC 40 is coupled to first and second narrow band tracking bandpass filters (TBPF) 42 and 50, respectively. The output of TBPF 42 at line 42a is connected to a signal detector 45 and to one input of a processing circuit 48. Signal detector 45 is coupled to the control (C) terminal of a ramp generator 46, to processing circuit 48 and to a look-up table 52. Ramp generator 46 produces on output line 46a an analog signal which is applied to a frequency control circuit 49 which may comprise a voltage controlled oscillator. Frequency control 49 is coupled to the control (C) terminal of TBPF 42 and to one input of a comparator circuit 51. Multiconductor cable 62a connects ramp generator 46 to the data input terminal (D) of a look-up table LUT 52 which may take the form of a pre-programmed read-only memory. A control output signal from processing circuit 48 is also coupled to a reset terminal (R) of ramp generator 46.

The output of LUT 52 is connected via multiconductor cable 52a to a second ramp generator 54. The signal output line 54a thereof is connected to a second frequency control 56 of similar design to that of frequency control 49. The output of frequency control 56 is coupled to the C input terminal of TBPF 50 and to a second input of comparator 51. The output of TBPF 50 on line 50a is connected to the input of signal detector 53, which is similar to signal detector 45, and to processing circuit 48 to provide frequency $Fb_{R3}$ thereto. Signal detector 53 is coupled to the C terminal of ramp generator 54 and to processing circuit 48. A control output signal from circuit 48 is coupled to the R terminal of ramp generator 54.

Processing circuit 48, which may be either in the form of hardware logic or in the form of a computing device, such as a microprocessor, processes input signals received on the connections thereto to compute angle B (FIG. 1) and if desired, any of ranges R1, R2 or R3. Each of the other circuits illustrated in FIG. 3 is of conventional design. In particular, TBPFs 42 and 50 are conventional tracking filters manufactured by EG & G Reticon as model R5602-3. Frequency control circuits 49 and 56 may comprise Signetics model 566 voltage controlled oscillators. Signal detectors 45 and 53 may comprise operational amplifiers set to trigger upon receipt of signals of greater than a given amplitude to produce a logic 1 output signal and to otherwise produce a logic 0. Ramp generator 46 as illustrated in FIG. 4 comprises a free running clock 60 coupled to an incrementing counter 62. Counter 62 is connected to a digital-to-analog converter 64 which produces on line 46a an analog signal equivalent to the count in the counter. A logic 1 signal applied to the C terminal causes the counter to stop counting. A logic 1 applied to the R terminal resets the counter. Ramp generator 54 as illustrated in FIG. 5 is similar to generator 46 except that counter 72 decrements upon receipt of input pulses from clock source 70 and it is loaded upon receipt of a load pulse at terminal L from line 54b with the data from LUT 52 on cable 52a.

Operation of the circuits of FIGS. 1 and 3 is as follows. When it is desired to measure the range and slope to a target 30, VCO 14 modulated by a signal from triangle wave generator 12 produces a signal (waveform 18, FIG. 2) which is coupled to balanced mixer 22 and to antenna 26 to be transmitted thereby to target 30. The transmitted signal may be, by way of example, 10.525 Gigahertz. Return signals from target 30 are also applied to balanced mixer 22 which thereby produces a beat frequency signal at terminal 36.

Because of the finite beam width angle 2A of the signal transmitted by antenna 26, the beat frequency signal produced at terminal 36 contains components ranging in frequency from $Fb_{R1}$ through $Fb_{R3}$. These signals which are typically of varying amplitudes are supplied to AGC 40 which provides an output signal in which all frequencies of interest are of equal amplitude.

Due to the environment in which the ranging system of FIG. 1 is situated, frequencies much above $Fb_{R3}$ are also present in the beat frequency signal due the known phenomena of multipath.

Counter 62 (FIG. 4) of ramp generator 46 normally increments from zero to some preselected value causing D/A 64 to produce a positively directed sawtooth waveform. The signal from D/A 64 which is supplied to frequency control 49 causes frequency control 49 to produce an output signal to be applied to the control terminal of TBPF 42 which causes it to initialize at a frequency which is lower than the lowest frequency $Fb_{R1}$ expected at terminal 36.

As a function of time ramp generator 46 produces an increasing amplitude signal which causes TBPF 42 to increase its center frequency until a signal appears on output line 42a thereof of frequency $Fb_{R1}$. When an output signal appears on line 42a of frequency $Fb_{R1}$ of predetermined magnitude, indicating TBPF 42 is centered at frequency $Fb_{R1}$, signal detector 45 produces a logic 1 signal which causes counter 62 (FIG. 4) to stop counting and thereby causes TBPF 42 to remain centered at frequency $Fb_{R1}$. The logic 1 signal from signal detector 45 signals processing circuit 48 to calculate range R1 from frequency $Fb_{R1}$ utilizing formula 1.

Furthermore, the signal value then being produced on line 62a, which is the count in counter 62 which corresponds to frequency $Fb_{R1}$, is transmitted by line 62a as an address to LUT 52. LUT 52 stores, for each value of $Fb_{R1}$ corresponding to each possible range R1, a number corresponding to the beat frequency value associated with the maximum possible range given (1) the beam width angle 2A for the particular antenna 26, and (2) the maximum slope $B_{MAX}$ of the material comprising target 30 where $B \leq B_{MAX}$. The maximum range will be less than a range associated with any multipath frequency component of the beat frequency signal. Thus, for example, burden material in a blast furnace can only lie at some known maximum slope which can be determined by experimentation.

Thus, data related to the various maximum ranges are predetermined and prestored in LUT 52. As an example, assume range R1 to be 10 meters corresponding to an $Fb_{R1}$ of 20 kilohertz. Assume also that given a particular beam angle 2A of antenna 26 such as 10° and a given angle $B_{MAX}$ such as 45°, the largest range could be 11.9 meters corresponding to a beat frequency of 23.8 kilohertz and assume further a multipath frequency component of 30 kilohertz. Then when TBPF 42 passes a signal of frequency 20 kilohertz, LUT 52 is addressed by the digital equivalent thereof to produce a digital signal on line 52a to set counter 72 (FIG. 5) of ramp generator 54 to a value such that frequency control 56 drives TBPF 50 to allow it to pass a frequency of 23.8 kilohertz on line 50a, a frequency which is at or above the maximum frequency $Fb_{R3}$ produced at terminal 36 but below the multipath frequency.

Ramp generator 54 thereafter produces a signal of decreasing amplitude which causes TBPF 50 to be set to pass lower and lower values of frequency until it becomes set to pass and does pass frequency $Fb_{R3}$. Signal detector 53 detects the presence of $Fb_{R3}$ of a given preselected amplitude and produces a logic 1 signal. The logic 1 signal is passed to processing circuit 48 to provide an indication that beat frequency signal $Fb_{R3}$ is available for processing, and is passed to the control (C) terminal of ramp generator 54 causing it to lock up. That is, counter 72, FIG. 5, is locked to the count which causes $Fb_{R3}$ to be passed by TBPF 50 and because of the use of LUT 52 does not become locked to some higher multipath frequency.

As illustrated in FIG. 3, comparator 51 monitors frequencies $Fb_{R3}$ and $Fb_{R1}$ from frequency control circuits 56 and 49, respectively. In a properly working system, since $Fb_{R1}$ corresponds to a minimum range it can only be less than or equal to $Fb_{R3}$ (the latter when R1 equals R3 in FIG. 1). Therefore, as indicated in block 51 when $Fb_{R3} < Fb_{R1}$, comparator 51 produces an error signal which may be utilized in any suitable manner such as to alert an operator that equipment repair is needed.

To summarize, when signal detector 53 produces a logic 1 signal, processing circuit 48 is receiving a signal on line 42a indicative of frequency $Fb_{R1}$ and therefore of range R1 and receiving a signal on line 50a indicative of frequency $Fb_{R3}$ and therefore of range R3. With that information and information concerning the value of angle A (FIG. 1), processing circuit 48 can compute angel B from the following equations. All equations will be given with reference to FIG. 1.

$$B = \arctan\left(\frac{b2}{a1 + a3}\right) \quad (2)$$

let b3 = b1 + b2     (3)
therefore b2 = b3 − b1     (4)
b3 = cosA × R3     (5)
b1 = cosA × R1     (6)
b2 = cosA (R3 − R1)     (7)
a1 = sinA × R1     (8)
a3 = sinA × R3     (9)
a1 + a3 = sinA (R3 + R1)     (10)

$$\text{therefore } B = \arctan\left(\frac{\cos A\,(R3 - R1)}{\sin A\,(R3 + R1)}\right) \quad (11)$$

Angle B can also be determined by use of the well known laws of sines and cosines to first determine the angles of the triangle illustrated in FIG. 1 by solid line utilizing a knowledge of angle 2A, R1 and R3 and then using the angle information so determined to calculate angle B.

It is often desirable to determine the range to target 30 directly in front of antenna 26 that is range R2 in FIG. 1. Processing circuit 48 may also have hardware logic or a stored computer program to determine range R2 in accordance with the following formulas:

R2 = b1 + b4     (12)
b1 = R1 × cosA     (13)
b4 = a1 × tanB = R1 × sinA × tanB     (14)
therefore R2 = R1 × cosA + R1 × sinA × tanB     (15)
R2 = R1 (cosA + sinA × tanB)     (16)

Once angle B and, if desired, range R2 have been computed, processing circuit 48 sends momentary reset pulses to ramp generators 46 and 54 and more particularly to counters 62 and 72 (FIGS. 4 and 5, respectively) to clear counter 62 to a zero count and counter 72 to a high count such that TBPF 42 is set to pass a frequency below $Fb_{R1}$ and TBPF 50 is set to pass a frequency above $Fb_{R3}$ whereupon the above described process repeats.

In some applications there may be a necessity only for determining range R1. In such a situation, in FIG. 3 all blocks having a callout number of 50 or greater may be eliminated.

What is claimed is:

1. A signal processing system for use with a radar range measuring system which transmits a radio frequency beam of known finite angle toward a target which is at not greater than a known non-normal angle to the beam to illuminate a portion thereof and receives a return reflected signal therefrom and produces therefrom a beat frequency signal having various frequency components corresponding to various ranges between said target and said range measuring system, said signal processing system comprising in combination:

means responsive to said beat frequency signal for determining the lowest frequency value $F_L$ thereof;

means responsive to frequency $F_L$ and to a knowledge of the maximum angle said target can attain and to said angle of said transmitted beam for determining the maximum frequency $F_X$ associated with the maximum distance to said target; and means responsive to frequency $F_X$ and to said beat frequency signal for determining the actual maximum frequency $F_H$ contained in said beat frequency signal.

2. The combination set forth in claim 1 further including means responsive to said signal at frequency $F_L$ and $F_H$ and to said antenna angle for determining the actual angle of said target.

3. The combination set forth in either claim 1 or claim 2 wherein said means for determining frequency $F_L$ comprises means producing a control signal at a succession of values and a tracking bandpass filter responsive to said beat frequency signal and to said control signal for passing said frequency $F_L$ at a particular value of control signal and means responsive to said frequency $F_L$ being passed by said tracking bandpass filter for locking said bandpass filter to said frequency $F_L$.

4. The combination as set forth in claim 3 wherein said means producing said control signal comprises a counter, means for advancing said counter and means for converting the count in said counter to said control signal and wherein said means responsive to said frequency $F_L$ being passed by said tracking bandpass filter comprises means responsive to the presence of said frequency $F_L$ for producing a signal for preventing said counter from changing its count.

5. The combination as set forth in claim 4 wherein said means for determining said maximum frequency comprises a look-up table responsive to the count in said counter when said counter is prevented from changing its count for providing a signal indicative of frequency $F_X$.

6. The combination set forth in claim 3 wherein said means for determining frequency $F_H$ comprises means for producing a second control signal at a succession of values, a second tracking bandpass filter responsive to said beat frequency signal and to said second control signal for passing said frequency $F_H$ at a particular value of said second control signal and means responsive to said frequency $F_H$ being passed by said second tracking bandpass filter for locking said second tracking bandpass filter to said frequency $F_H$.

7. The combination as set forth in claim 6 wherein said means responsive to said frequency $F_X$ comprises means for causing said means producing said second control signal to produce said second control signal of a value which causes said second tracking bandpass filter to pass a signal initially at frequency $F_X$.

8. The combination as set forth in claim 7 wherein said means producing said second control signal comprises a second counter, means for decrementing said second counter and means for converting the count in said second counter to said second control signal and wherein said means responsive to said frequency $F_H$ being passed by said second tracking bandpass filter comprises means responsive to the presence of said frequency $F_H$ producing a signal for preventing said second counter from changing its count.

9. The combination as set forth in claim 8 wherein said means responsive to said frequency $F_X$ includes means for setting said second counter to a count which causes said second tracking bandpass filter to initially pass frequency $F_X$.

10. The combination as set forth in either claim 1 or claim 2 wherein said means for determining said maximum frequency comprises a look-up table responsive to the value of said frequency $F_L$ for providing a signal indicative of frequency $F_X$.

11. The combination as set forth in either claim 1 or claim 2 wherein said means for determining said frequency $F_H$ comprises means for producing a control signal at a succession of values, a tracking bandpass filter responsive to said beat frequency signal and to said control signal for passing said frequency $F_H$ at a particular value of control signal and means responsive to said frequency $F_H$ being passed by said tracking bandpass filter for locking said tracking bandpass filter to said frequency $F_H$.

12. The combination as set forth in claim 11 wherein said means responsive to said frequency $F_X$ comprises means for causing said means producing said control signal to produce a signal of value which causes said tracking bandpass filter to pass a signal initially at frequency $F_X$.

13. The combination as set forth in claim 12 wherein said means producing said control signal comprises a counter, means for decrementing said counter and means for converting the count in said counter to said control signal and wherein said means responsive to said frequency $F_H$ being passed by said tracking bandpass filter comprises means responsive to the presence of said frequency $F_H$ for producing a signal for preventing said counter from changing its count.

14. The combination as set forth in claim 13 wherein said means responsive to said frequency $F_X$ includes means for setting said counter to a count which causes said tracking bandpass filter to initially pass frequency $F_X$.

* * * * *